Figure 2:
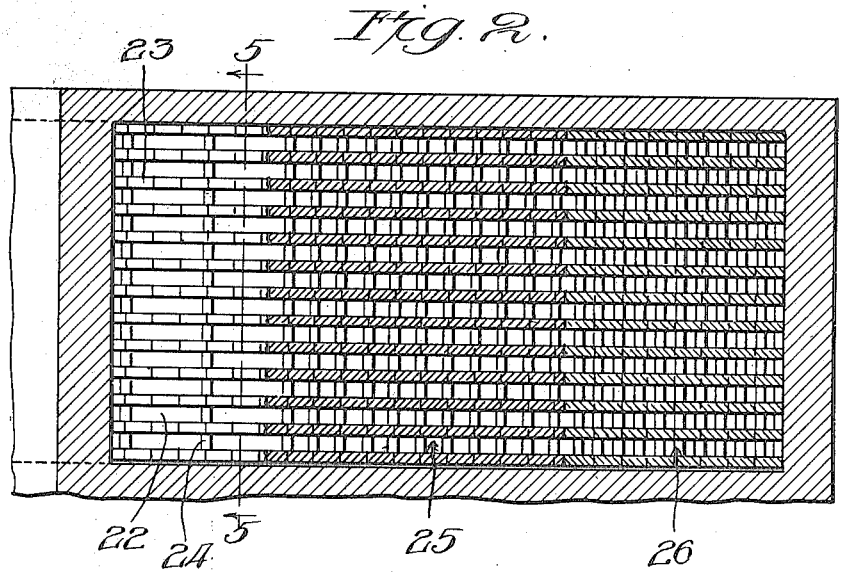

F. ORTH.
REGENERATOR.
APPLICATION FILED MAR. 7, 1916.

1,207,617.

Patented Dec. 5, 1916.
5 SHEETS—SHEET 1.

Witness:
Harry S. Gaither

Inventor:
Frank Orth
by Lamson & Lamson
Attys

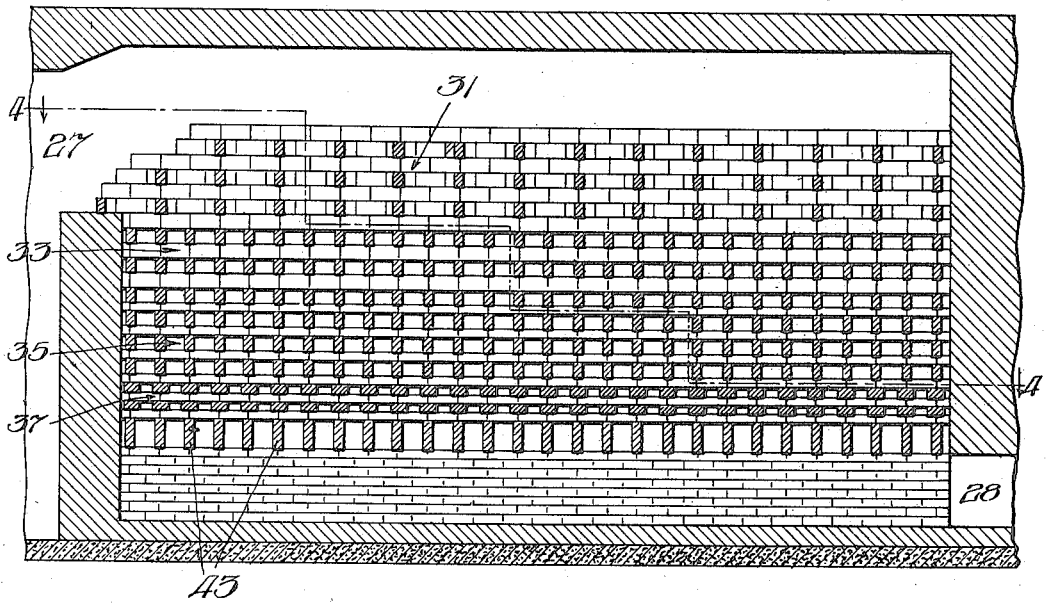
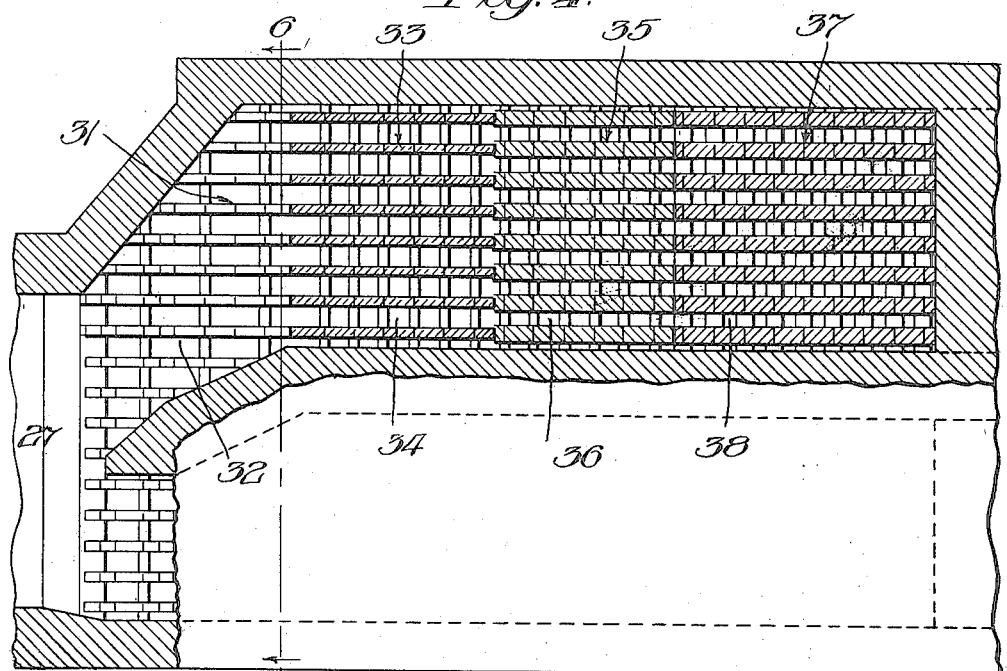

F. ORTH.
REGENERATOR.
APPLICATION FILED MAR. 7, 1916.

1,207,617.

Patented Dec. 5, 1916.
5 SHEETS—SHEET 3.

Witness
Harry S. Gather

Inventor:
Frank Orth
by Lanny & Lanny
Attys

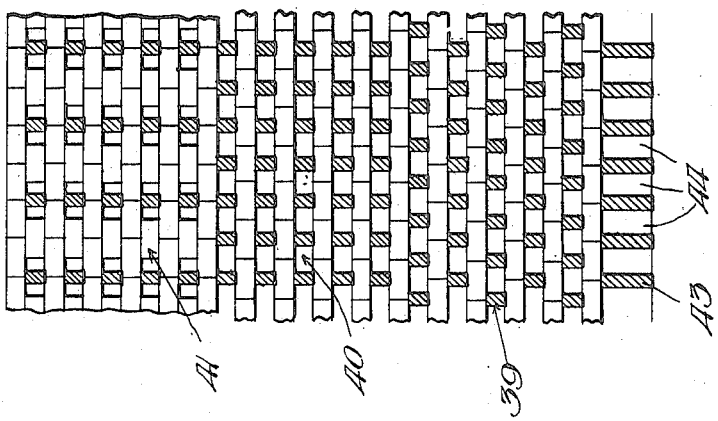
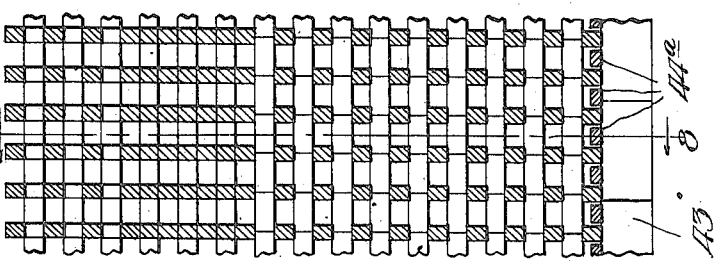
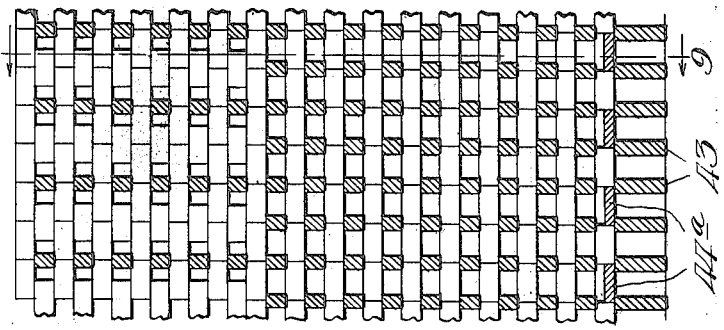

F. ORTH.
REGENERATOR.
APPLICATION FILED MAR. 7, 1916.

1,207,617.

Patented Dec. 5, 1916.
5 SHEETS—SHEET 5.

Witness:
Harry S. Grather

Inventor:
Frank Orth
by Lanning & Lanning
Attys

UNITED STATES PATENT OFFICE.

FRANK ORTH, OF INDIANA HARBOR, INDIANA.

REGENERATOR.

1,207,617. Specification of Letters Patent. Patented Dec. 5, 1916.

Application filed March 7, 1916. Serial No. 82,536.

*To all whom it may concern:*

Be it known that I, FRANK ORTH, a citizen of the United States, residing at Indiana Harbor, in the county of Lake and State of Indiana, have invented certain new and useful Improvements in Regenerators, of which the following is a specification.

This invention has to do with improvements in regenerators.
In the operation of the regenerators used in connection with open-hearth furnaces and the like, the dust carried in suspension tends to burn or cinder onto the checkerwork or other heat absorbing material, such tendency depending, among other things, upon the temperature of the gas and heat absorbing material, the violence with which the dust is driven against the heat absorbing material, and the amount of dust carried in suspension. The tendency to cinder is greatest on the incoming side of the hot gases, because the gases are hottest when they first enter the regenerator, and they also carry their greatest load of dust at that time.
The cindering of a given thickness of material onto the periphery of a checkerwork passage of small size will result in a much greater percentage reduction in the opening of said passage than will the cindering of an equal thickness of material on a passage of larger size. Consequently, it is desirable to provide the largest possible openings on the incoming side of hot gases of the regenerator. However, the provision of relatively large passages through the entire body of the checkerwork would, in many cases, be objectionable. This is true not only because the provision of relatively large openings serves, to some extent, to cut down the amount of heat absorbing material which may be brought within a regenerator of given size, but also serves to interfere with a proper distribution of the gases through the discharge portions of the checkerwork.
There is a tendency for the hot gases to remain in the upper portion of the regenerator chamber as long as possible, and consequently there is a tendency for said gases to pass down through the checkerwork at the rear end of the chamber in greater proportion than in the forward end of the chamber. Conversely the incoming cold air on the reverse half of the cycle tends to remain in the lower portion of the chamber as long as possible, and consequently, said air tends to travel along the lower portion of the chamber to the front end thereof before it passes up through the checkerwork. These tendencies result in an unequal distribution of the heating and cooling of the checkerwork, so that the maximum efficiency of the regenerator is not secured. This tendency is greatly enhanced where the relatively large openings previously mentioned are carried clear through the checkerwork, and consequently it is not desirable to carry large flue openings any farther into the body of the checkerwork than necessary. On the other hand, by making the openings on the discharge side of the checkerwork relatively small, not only is the amount of heat absorbing material in said portion of the checkerwork increased, but also the gases are forced to a very great extent to distribute themselves uniformly over the entire mass of heat absorbing material on both halves of the cycle, because the flow of the gas and air is controlled or regulated by the presence of small openings in much greater degree than by the presence of large openings.

During the latter stages of the run or campaign of the regenerator, the relatively large openings on the incoming side of the checkerwork are diminished in area by the cindering of the flue dust. Little, if any, flue dust clings onto the checkerwork in the outgoing side, and, therefore, there is little, if any, change in the area of the openings in this portion of the structure. In order to so arrange the structure that in the latter portions or stages of the campaign, the openings shall be of substantially the same size, from the incoming to the outgoing sides, these openings should progressively decrease in size toward the discharge side. This will not only permit the use of relatively small openings on the discharge side in combination with relatively large openings on the incoming side, but will secure such result in combination with the provision of a maximum amount of heat absorbing material within the regenerator chamber of given size.

Therefore, one of the objects of the present invention is to so construct the checkerwork or other heat absorbing body that the openings will progressively decrease in size from the incoming toward the outgoing side. Where the gases are traveling through straight flues or passages, the transfer of heat between the gases and the structure is not as thorough and complete as it is where the gases are caused to travel through tortuous or zigzag passages. Therefore, another object of the invention is to construct the regenerator or a desired portion of the same with tortuous passages so as to insure a more perfect transfer of heat between the gas and checkerwork, or between the checkerwork and the air. In this connection, another object is to combine such a structure with a structure having openings progressively decreasing in size from the point of entrance toward the point of delivery of the gases.

In many cases, the distribution of gases and air in their travel through the checkerwork cannot be definitely determined until after the regenerator has been constructed. In such cases, it may be desired to modify the structure after it has been substantially completed so as to secure a more uniform distribution, and thus overcome the tendency previously referred to of the hot gases to travel downwardly through the forward portion of the structure, and the tendency of the air to travel upwardly through the rear portion of the structure. Therefore, another object of the invention is to provide a construction such that the available openings in the lower portion of the checkerwork may be changed or modified by decreasing them to whatever extent may be desirable in order to secure a substantially uniform distribution of the gases and air through the checkerwork on both halves of the cycle.

Where the sizes of the passages are to be progressively modified from the incoming toward the outgoing side of the gases, such modification or variation may be secured either by setting the blocks closer together or farther apart in the various portions, or by laying the blocks in different manners in the several portions. Therefore, another object of the invention has reference to the provision of the desired graduation of the sizes of the passages by laying the blocks in different manners in the different portions of the structure, while at the same time keeping the blocks in substantial alinement vertically.

It has been customary in the past, as far as I am aware in structures of this kind, to set the adjoining blocks of each course in alinement with each other, so that their end portions are not fully exposed to the heating action of the hot gases, or the cooling action of the air. Another object of the invention is to provide a method of laying blocks by staggering them so as to expose the end portions of all blocks to the gases and to the air, so as to secure the most rapid possible transfer of heat between the blocks and the gas or air.

Where the blocks are of considerable bulk or volume, the heat will penetrate into or travel out from the central portions of the blocks relatively slow, so that it is impossible to secure a very rapid transfer of heat into and out of said central portions. Nevertheless there are many cases in which the use of relatively large blocks is desirable on account of other reasons. Therefore, another object of the invention is to so construct the blocks that even when they are made in relatively large sizes, the heat can very readily penetrate into or be delivered from all portions of their volume.

Other objects and uses of the invention will appear from a detailed description of the same which consists in the features of construction and combinations of parts hereinafter described and claimed.

Figure 1:
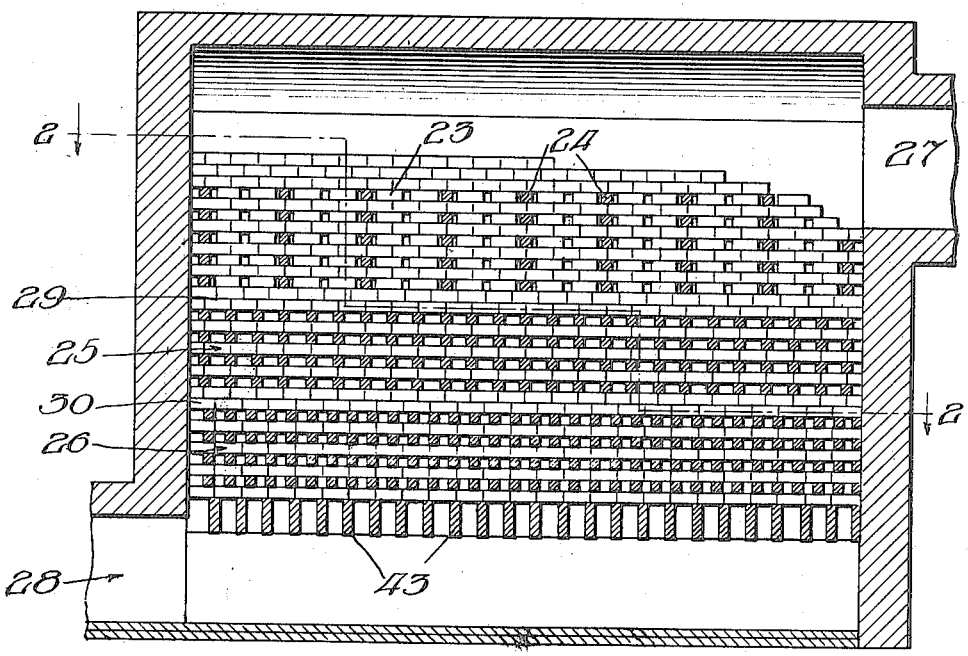
Figure 6:
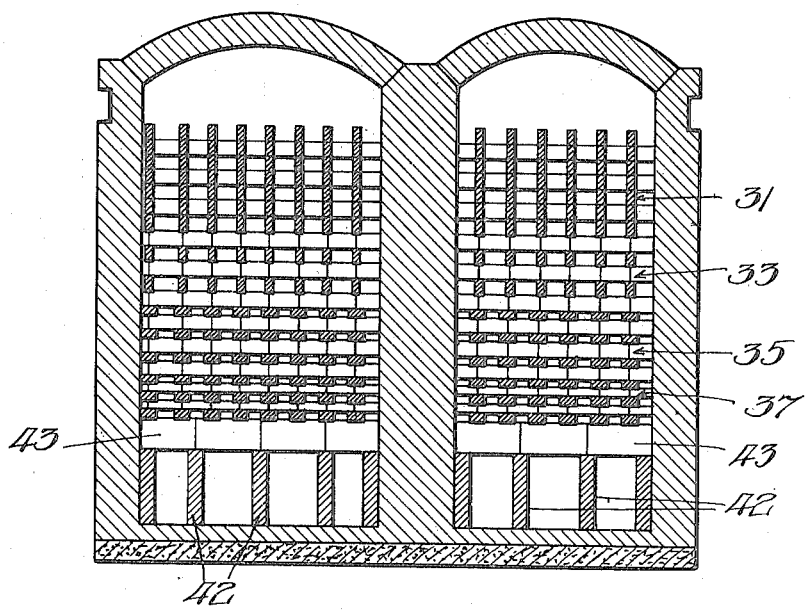
Figure 5:
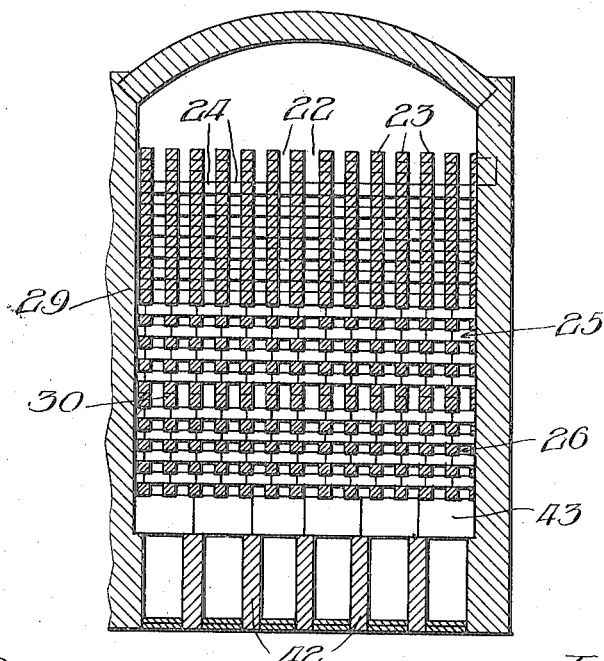
Figure 11:
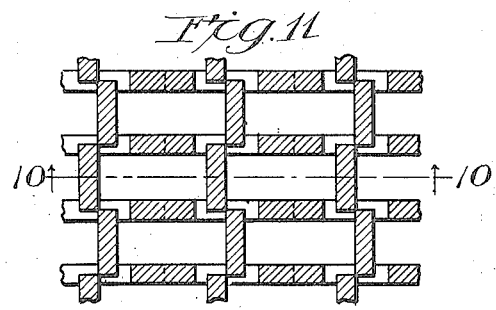
Figure 13:
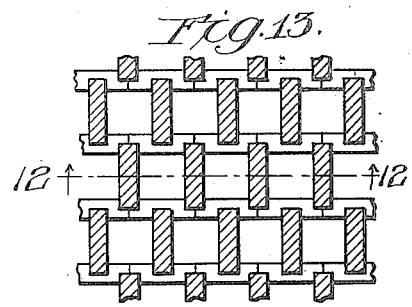
Figure 10:
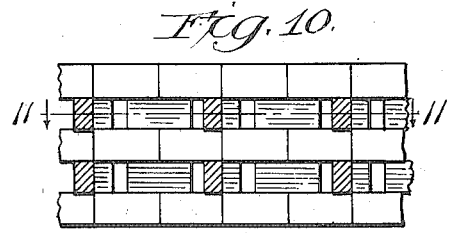
Figure 12:
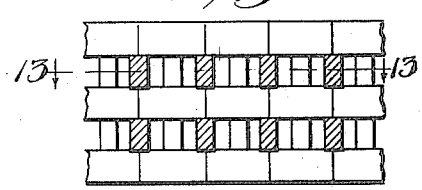
Figure 15:
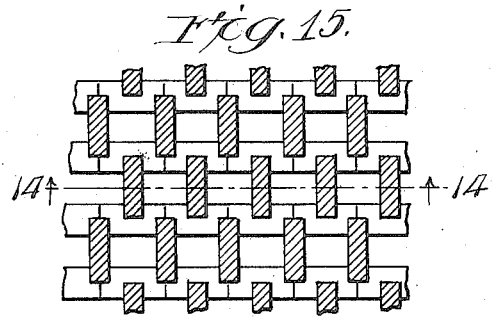
Figure 17:
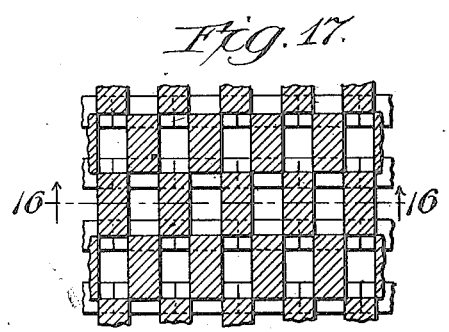
Figure 14:
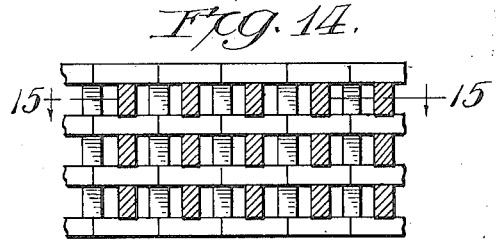
Figure 16:
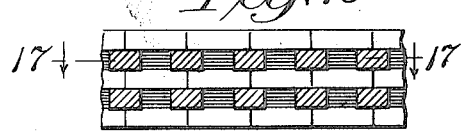
Figures 18, 19:
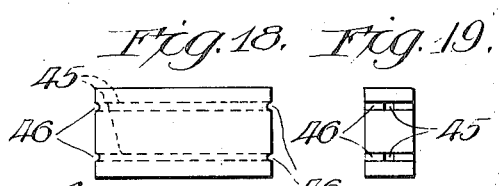
Figures 20, 21:
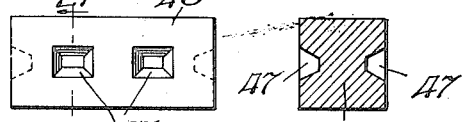

Referring to the several drawings: Figure 1 shows a vertical section through a regenerator structure embodying the features of the present invention; Fig. 2 is a broken horizontal section taken on the line 2—2 of Fig. 1, looking in the direction of the arrows; Fig. 3 is a vertical section through another form of regenerator embodying the features of the present invention, and in which the variations or changes in the sizes of the openings are secured by laying the blocks in different manners in the different portions of the structures instead of setting blocks closer together or farther apart, as in the arrangement shown in Figs. 1 and 2; Fig. 4 is a broken horizontal section taken on the line 4—4 of Fig. 3, looking in the direction of the arrows; Fig. 5 is a vertical cross section through the structure shown in Figs. 1 and 2, being taken on the line 5—5 of Fig. 2, looking in the direction of the arrows; Fig. 6 is a vertical cross section through the structure shown in Figs. 3 and 4, being taken on the line 6—6 of Fig. 4, looking in the direction of the arrows; Fig. 7 is a fragmentary vertical section through a modified type of structure in which is embodied the idea of staggering the blocks or a portion of them: Fig. 8 is a vertical fragmentary section through a portion of a structure in which have been employed removable blocks in the lower portion for regulating or controlling the available openings for the purpose previously mentioned, being taken on the line 8—8 of Fig. 9, looking in the direction of the arrows; Fig. 9 is a cross section taken on the line 9—9 of Fig. 8, looking in the direction of the arrows; Fig. 10 is a fragmentary section through the upper portion of a structure in which the blocks are offset with respect to each other so as to expose their end portions, being taken on the line 10—10 of Fig. 11, looking in the direction of the arrows; Fig. 11 is a fragmentary horizontal section taken on the line 11—11 of Fig. 10, looking in the direction of the arrows; Fig. 12 is a view similar to Fig. 10, taken through the upper central portion of the structure, being a section taken on the line 12—12 of Fig. 13, looking in the direction of the arrows; Fig. 13 is a horizontal section taken on the line 13—13 of Fig. 12, looking in the direction of the arrows; Fig. 14 is a view similar to Fig. 10, through the lower central portion of the structure, being taken on the line 14—14 of Fig. 15, looking in the direction of the arrows; Fig. 15 is a section taken on the line 15—15 of Fig. 14, looking in the direction of the arrows; Fig. 16 is a view similar to Fig. 10, with the exception that it is taken in the lower portion of the structure, being taken on the line 16—16 of Fig. 17, looking in the direction of the arrows; Fig. 17 is a section taken on the line 17—17 of Fig. 16, looking in the direction of the arrows; Fig. 18 is a side view of the large block provided with one or more ventilating openings to permit the flow of gas or air to the interior portion of the block; Fig. 19 is an end view of the block of Fig. 18; Fig. 20 is a side view of another type of large block having its faces provided with depressed panels or the like; and Fig. 21 is a section taken on the line 21—21 of Fig. 20, looking in the direction of the arrows.

In the construction shown in Figs. 1, 2 and 5, the checkerwork in the upper portion of the chamber is provided with the elongated openings 22 which are of considerable size. These openings lie between the perforated partitions 23, the openings lying between the tie blocks 24. The central portion of the structure 25 has its openings materially smaller than those in the upper portion, and, in fact, in the particular arrangement illustrated, each opening of the central portion is approximately one-fourth the size of each opening in the upper portion. The openings in the lower portion 26 are still smaller. It thus appears that there is a graduated reduction in size measuring from the gas inlet 27 to the gas outlet 28. In other words, the sizes of the openings are decreased in the direction of diminution of temperature. As a convenient form of construction, I have shown the parallel riders or the like 29 between the upper and central portions of the structure, and the parallel riders 30 between the central and lower portions of the structure. These serve to provide a plurality of longitudinally extending clean out passages through which the gas may redistribute as it flows from one section of the structure to the next.

It will be observed from an examination of the above mentioned figures, that all portions of the structure are formed from blocks of substantially uniform size and cross section, and that the variations in size of opening are secured by setting the blocks closer together or farther apart as desired.

Referring now to the arrangement shown in Figs. 3, 4, and 6, it will be observed that a similar diminution of size of opening is provided, but, in this case, such diminution is secured by setting the blocks of the different portions of the structure in different manners. The blocks illustrated in the construction now under consideration are larger in one sectional dimension than in the other, so that they have flat sides and narrow edges. In the upper portion 31 of the structure all of the blocks are set on edge, besides which certain of the usual cross ties are left out, so that the openings 32 are quite large. In the next lower portion of the structure 33, all of the blocks are also set on edge, but the intermediate cross ties which were not present in the upper portion 31 are present in the portion 33, so that the openings 34 are very much smaller. In the next lower portion of the structure 35, the longitudinally extending courses are laid on their flat sides, while the cross ties are laid on edge. Consequently, the openings 36 of this section are diminished in size by an amount dependent upon the difference of the blocks in one dimension as compared to the other dimension. In the lowermost portion of the structure 37 all of the blocks are laid on their flat sides, so that the openings 38 are still further reduced by an amount dependent upon the difference between the two dimensions of the cross tie blocks.

In the structure shown in Fig. 7, the blocks 39 in the lower portion of the structure are staggered in a vertical direction, so that as the gases flow down, or as the air flows up, a baffling or similar effect is secured. In the arrangement shown in this construction, the openings in the central portion 40 are substantially the same in size as those in the lower portion 39, but the vertical openings in the portion 40 are practically straight. The same is true of the portion 41, with the exception that in this case every alternate tie is reversed in direction, so that it becomes a portion of the longitudinal wall, with the result that the vertical openings are increased to more than twice their previous size. It is customary in most regenerator constructions to provide a plurality of longitudinally extending rider walls 42 on which the regenerator structure is supported. The cross blocks 43 rest on the rider walls and directly carry the checkerwork. Ordinarily these cross blocks correspond in number with the number of openings in the lower portion of the structure, and the gases flow down through all of the openings 44 between the blocks 43. It was previously explained that one of the objects of this invention is to provide a structure in which the distribution of gas throughout the entire body of the structure may be controlled on the heating portion of the cycle, and in which the distribution of air throughout the entire body of the structure may be controlled on the cooling portion of the cycle. I have, therefore, illustrated the removal blocks 44ª set on the cross blocks 43 and supported by them, said blocks 44ª being placed in selected openings so as to reduce the number and size of the available passages in the selected parts of the lower portion of the structure.

Reference to Figs. 11 to 17 inclusive will show the manner in which the cross blocks may be laid in staggering relationship when desired, so as to expose their end portions. The various sections shown in said figures would correspond to similar sections in the structure shown in Figs. 3, 4, and 6. The sizes of the openings in the structure shown in Figs. 11 to 17 inclusive are controlled or modified by laying blocks of a given size in different manners, and, therefore, the distinction between the structure now under consideration as compared to that shown in Figs. 3, 4, and 6, is that the cross tie blocks are staggered. This will expose all of their end portions to the absorbing or delivery of heat with great facility.

Reference to Figs. 18 and 19 shows a block of relatively large dimensions provided with a desired number of perforations 45 extending through it in desired directions and positions, so that the air and gas may readily circulate to the interior of such large block, in order to insure transfer of heat readily to and from its central body portions. When two or more blocks, such as that shown in Figs. 18 and 19, are set together, end to end, the openings 45 of the consecutive blocks would line up with each other but would not communicate with the gas or air within the body of the chamber. Consequently I illustrate the notches 46 in the end portions of such block, said notches providing communication between the perforations 45 and other surfaces of the blocks, so that even if two such blocks are set close together, the air and gas may readily transfer to or from the passages 45.

In the block shown in Figs. 20 and 21, there are provided one or more depressions 47 in the side faces of the blocks, so that the central portion 48 is relatively thin. Consequently, this type of block presents the advantage that the heat may be readily transferred into or from the central body portion of the block without the necessity of actually causing the air or gas to enter into the body of the block. Either of the forms shown in Figs. 18 and 19 or in Figs. 20 and 21 would be of great advantage for use in those cases where blocks of large size are desired.

As the hot gases travel through the regenerator, their temperature falls, owing to the absorption of heat into the regenerator structure. Consequently, other things being equal, the volume of gas will also diminish. For example, other things being equal, a reduction of temperature from 2000° F. to 1000° F., will cause a reduction in gas volume approximately in the ratio of ten to six. It, therefore, follows that the total area of all of the regenerator flues or openings on the delivery side may be smaller than the total area of said openings on the incoming side substantially in the ratio of ten to six, without increasing the gas velocity as the gases are delivered from the heat absorbing structure.

In many previous forms of construction, the openings on the delivery side have been larger than is actually necessary, taking into account the fact of the reduction of gas temperature. Therefore, I have so related the total area of the openings on the incoming side to the total area of the said openings on the delivery side in such proportion as to maintain a substantially constant gas velocity throughout the entire body of the regenerator structure. This enables me to increase the amount of heat absorbing material in the delivery side of the regenerator without increasing the gas velocity by undue restriction of the gas passages or flues. It will be understood, however, that this relationship between the total area of openings on the incoming side as compared to the total area of said openings on the delivery side is not necessarily the same as the relationship between the area of each individual opening on the incoming side as compared to the area of each individual opening on the delivery side.

I claim:

1. In a regenerator, the combination with an inclosing chamber, of a heat absorbing structure comprising a checkerwork of blocks within the same, said structure being provided with a plurality of substantially vertical draft openings between the blocks leading in the direction of gas travel, each of said openings being of relatively large cross sectional area on the incoming side as compared to its cross sectional area on the outgoing side, and each of said passages being periodically reduced in size between its incoming and outgoing sides, the regenerator sections with the passages of different sizes being in vertical alinement, for the purpose specified.

2. In a regenerator, the combination with an inclosing chamber, of a heat absorbing structure comprising a checkerwork of blocks within the same, said structure being provided with a plurality of gas passages between the blocks leading in the direction of gas travel, selected ones of said passages being periodically reduced in cross sectional area in the direction of gas flow, the regenerator sections with the passages of different sizes being in vertical alinement, for the purpose specified.

3. In a regenerator, a heat absorbing structure comprising a checkerwork of blocks having gas passages extending between the blocks and through its body, said passages diminishing in size from the incoming toward the outgoing side of the regenerator substantially according to the probable amount of obstruction occasioned by flue dust collecting on the surfaces of the passages during the usual run of the regenerator, the regenerator sections with the passages of different sizes being in vertical alinement, for the purpose specified.

4. In a regenerator, a heat absorbing structure formed of blocks of substantially uniform size, each block being thinner than its width, all of said blocks being laid up in courses extending in alternate directions, and the blocks in the upper courses being laid on edge, while the blocks in the lower courses are laid on their flat sides, for the purpose of thereby diminishing the area of the gas passages from the upper to the lower portion of the regenerator.

5. In a regenerator, a heat absorbing structure formed of blocks, all of the blocks being of substantially the same size, each block being of greater dimension in one direction than in another direction, all of the blocks being laid in courses extending alternately in different directions, and the blocks in the upper courses being laid on edge, while the blocks in the lower courses are laid on their flat sides, to thereby provide a reduction in size of gas passages from the upper to the lower portion of the structure.

6. In a regenerator, a heat absorbing structure formed of blocks, the blocks being of greater dimension in one direction than in another direction, and the blocks being laid in courses extending alternately in different directions, the blocks in the courses on the incoming side being laid on edge and the blocks in the courses on the outgoing side being laid on their flat surfaces, to thereby provide a reduction in size of gas passages in the direction of gas flow.

7. In a regenerator, a heat absorbing structure formed of blocks, each block being of greater dimension in one direction than in another direction, the blocks on the incoming side of the regenerator being laid on different faces from the blocks on the outgoing side of the regenerator to thereby provide a reduction in size of gas passages in the direction of gas travel.

8. In a regenerator, the combination with a checkerwork of heat absorbing structure, of a plurality of stringers on which said checkerwork is placed, and blocks removably mounted on said stringers at desired positions intermediate the blocks of the checkerwork for the purpose of controlling the flow of gas and air through the checkerwork.

9. In a regenerator, the combination with a checkerwork and a suitable support for the same, of a foundation on which said checkerwork is placed, and blocks removably mounted on said foundation intermediate the blocks of the checkerwork for the purpose of controlling the flow of gas and air through the checkerwork.

10. In a regenerator, the combination with a heat absorbing structure having numerous passages extending through its body, of blocks removably supported in selected ones of said passages for the purpose of controlling the flow of gas and air through the checkerwork.

11. In a regenerator, a checkerwork comprising blocks, said blocks being laid up in courses extending alternately in opposite directions, the blocks of alternate courses being staggered lengthwise of said courses to thereby expose the end portions of said blocks, and the blocks of each intermediate course being in alinement with the other blocks of such course, for the purpose specified.

12. In a regenerator, a heat absorbing structure comprising blocks, said blocks being laid up alternately in straight courses and staggered courses, the blocks of each straight course being in alinement, and the blocks in the staggered courses having their end portions exposed for the purpose specified.

13. In a regenerator, a heat absorbing structure comprising an open checkerwork of blocks, selected blocks being staggered with respect to adjacent blocks for the purpose of exposing their end portions.

14. In a regenerator, the combination with an inclosing chamber, of a heat absorbing structure comprising a checkerwork of blocks within the same, said structure being provided with a plurality of gas passages between the blocks leading in the direction of gas travel, selected ones of said passages being vertically reduced in cross sectional area in the direction of gas flow, the regenerator sections with the passages of different sizes lying in alinement with each other, whereby the gases flowing through the different sections travel continuously in the same direction, for the purpose specified.

15. In a regenerator, a checkerwork comprising blocks, said blocks being laid up in courses extending alternately in opposite directions, the blocks of alternate courses being staggered lengthwise of said courses to thereby expose the end portions of said blocks, and the blocks of each intermediate course being in alinement with the other blocks of such course, and the openings on the out-going side of the checkerwork in the direction of hot gas travel being smaller than the openings on the incoming side of the checkerwork, for the purpose specified.

16. In a regenerator, a heat absorbing structure comprising blocks, said blocks being laid up alternately in straight courses and staggered courses, the blocks of each straight course being in alinement, and the blocks in the staggered courses having their end portions exposed, and the openings on the outgoing side of the structure in the direction of hot gas travel being smaller than the openings on the incoming side structure, for the purpose specified.

FRANK ORTH.

Witnesses:
   FRANCES M. FROST,
   THOMAS A. BANNING, Jr.